(12) United States Patent
Ezrielev et al.

(10) Patent No.: US 12,430,008 B2
(45) Date of Patent: Sep. 30, 2025

(54) MANAGING DATA PIPELINES USING GRAPHICAL USER INTERFACES

(71) Applicant: Dell Products L.P., Round Rock, TX (US)

(72) Inventors: Ofir Ezrielev, Beer Sheva (IL); Hanna Yehuda, Acton, MA (US); Inga Sogaard, Wichita, KS (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 18/343,917

(22) Filed: Jun. 29, 2023

(65) Prior Publication Data

US 2025/0004615 A1  Jan. 2, 2025

(51) Int. Cl.
*G06F 9/50* (2006.01)
*G06F 3/0484* (2022.01)
*G06F 8/656* (2018.01)
*G06F 9/38* (2018.01)
*G06F 9/451* (2018.01)
*G06F 9/455* (2018.01)
*H04L 51/42* (2022.01)
*G06F 9/54* (2006.01)
*G06F 11/3604* (2025.01)

(52) U.S. Cl.
CPC ............ *G06F 3/0484* (2013.01); *G06F 8/656* (2018.02); *G06F 9/451* (2018.02); *H04L 51/42* (2022.05); *G06F 9/3867* (2013.01); *G06F 9/3869* (2013.01); *G06F 9/455* (2013.01); *G06F 9/5005* (2013.01); *G06F 9/541* (2013.01); *G06F 9/542* (2013.01); *G06F 11/3608* (2013.01)

(58) Field of Classification Search
CPC ....... H04L 51/42; G06F 3/0484; G06F 8/656; G06F 9/451; G06F 9/541; G06F 9/542
See application file for complete search history.

(56) References Cited

U.S. PATENT DOCUMENTS

| 7,315,805 B2 | 1/2008 | Slater |
| 9,990,383 B2 | 6/2018 | Brinnand |
| 10,168,691 B2 | 1/2019 | Zornio et al. |

(Continued)

OTHER PUBLICATIONS

Arnab Ghosh Chowdhurry et al., An Approach for Data Pipeline with Distributed Query Engine for Industrial Applications, 2020 IEEE, [Retrieved on Aug. 19, 2025]. Retrieved from the internet: <URL: https://ieeexplore.ieee.org/stamp/stamp.jsp?tp=&arnumber=9212050> 4 Pages (1005-1008) (Year: 2020).*

(Continued)

*Primary Examiner* — Anibal Riveracruz
(74) *Attorney, Agent, or Firm* — WOMBLE BOND DICKINSON (US) LLP

(57) ABSTRACT

Methods and systems for managing operation of a data pipeline are disclosed. To manage the data pipeline, a system may include one or more data sources, a data repository, and one or more downstream consumers. Updates to the data pipeline may cause the data pipeline to become misaligned. To avoid misalignment and, therefore, failure of the data pipeline, information regarding the operation of the data pipeline may be distributed and used to decide how to update the data pipeline. The update may be evaluated through simulation prior to implementation.

20 Claims, 12 Drawing Sheets

(56) References Cited

U.S. PATENT DOCUMENTS

| | | | |
|---|---|---|---|
| 10,936,479 B2 | 3/2021 | Maag et al. | |
| 11,101,037 B2 | 8/2021 | Allen | |
| 11,221,270 B2 | 1/2022 | Evans | |
| 11,341,605 B1 | 5/2022 | Singh | |
| 11,853,853 B1 | 12/2023 | Beauchesne et al. | |
| 12,008,046 B1 | 6/2024 | Curtis et al. | |
| 12,216,651 B2 | 2/2025 | Krishnan | |
| 12,242,892 B1 | 3/2025 | Burnett | |
| 2004/0064750 A1 | 4/2004 | Conway | |
| 2006/0009881 A1 | 1/2006 | Ferber et al. | |
| 2013/0227573 A1 | 8/2013 | Morsi | |
| 2014/0037161 A1 | 2/2014 | Rucker | |
| 2014/0136184 A1 | 5/2014 | Hatsek | |
| 2016/0098037 A1 | 4/2016 | Zornio | |
| 2018/0081871 A1 | 3/2018 | Williams | |
| 2019/0034430 A1 | 1/2019 | Das | |
| 2019/0236204 A1 | 8/2019 | Canim | |
| 2019/0251479 A1 | 8/2019 | Anderson et al. | |
| 2019/0370263 A1 | 12/2019 | Nucci | |
| 2020/0166558 A1 | 5/2020 | Weis | |
| 2020/0167224 A1 | 5/2020 | Abali | |
| 2020/0202478 A1 | 6/2020 | Thumpudi et al. | |
| 2020/0293684 A1 | 9/2020 | Harris | |
| 2021/0027771 A1 | 1/2021 | Hall | |
| 2021/0116505 A1 | 4/2021 | Shu | |
| 2021/0374143 A1 | 12/2021 | Neill | |
| 2021/0377286 A1 | 12/2021 | Shukla et al. | |
| 2021/0406110 A1 | 12/2021 | Vaid et al. | |
| 2022/0092234 A1 | 3/2022 | Karri | |
| 2022/0301027 A1 | 9/2022 | Basta | |
| 2022/0310276 A1 | 9/2022 | Wilkinson | |
| 2022/0374399 A1 | 11/2022 | Kementsietsidis | |
| 2023/0014438 A1* | 1/2023 | Jones | G06F 8/77 |
| 2023/0040834 A1 | 2/2023 | Haile | |
| 2023/0126260 A1 | 4/2023 | Elsakhawy et al. | |
| 2023/0153095 A1 | 5/2023 | Rahill-Marier | |
| 2023/0161596 A1* | 5/2023 | Vadapandeshwara | G06F 8/35 712/214 |
| 2023/0196096 A1 | 6/2023 | Milne | |
| 2023/0213930 A1 | 7/2023 | Rakshit | |
| 2023/0315078 A1 | 10/2023 | Sepulveda et al. | |
| 2023/0342281 A1* | 10/2023 | Haile | G06F 11/3692 |
| 2023/0418280 A1 | 12/2023 | Emery | |
| 2024/0119364 A1* | 4/2024 | Jain | G06N 20/00 |
| 2024/0126888 A1 | 4/2024 | Kalou et al. | |
| 2024/0235952 A9 | 7/2024 | Hicks | |
| 2024/0281419 A1 | 8/2024 | Alfaras | |
| 2024/0281522 A1 | 8/2024 | Kuo | |
| 2024/0330136 A1 | 10/2024 | Furlong | |
| 2024/0412104 A1 | 12/2024 | Zhang | |

OTHER PUBLICATIONS

Wang, Haozhe, et al., "A graph neural network-based digital twin for network slicing management," IEEE Transactions on Industrial Informatics 18.2 (2020): 1367-1376 (11 Pages).

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

Bosch et al., "Towards Automated Detection of Data Pipeline Faults", 2020 27th Asia-Pacific Software Engineering Conference (APSEC). IEEE, pp. 346-355 (Year: 2020).

Grafberger et al., "Towards Interactively Improving ML Data Preparation Code via Shadow Pipelines", DEEM '24: Proceedings of the Eighth Workshop on Data Management for End-to-End Machine Learning, published on Jun. 9, 2024, retrieved from <https://doi.org/10.1145/3650203.3663327> on Aug. 11, 2025 (5 pages).

* cited by examiner

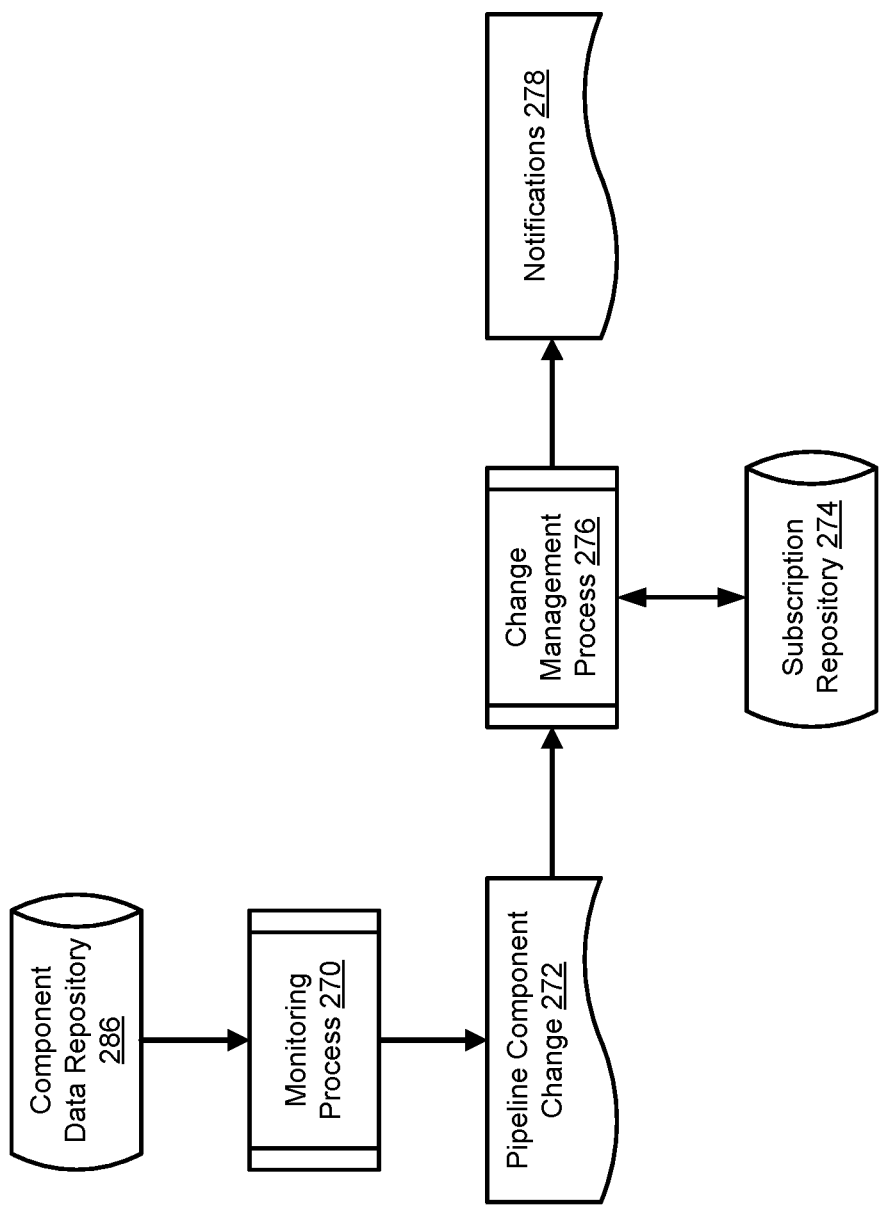

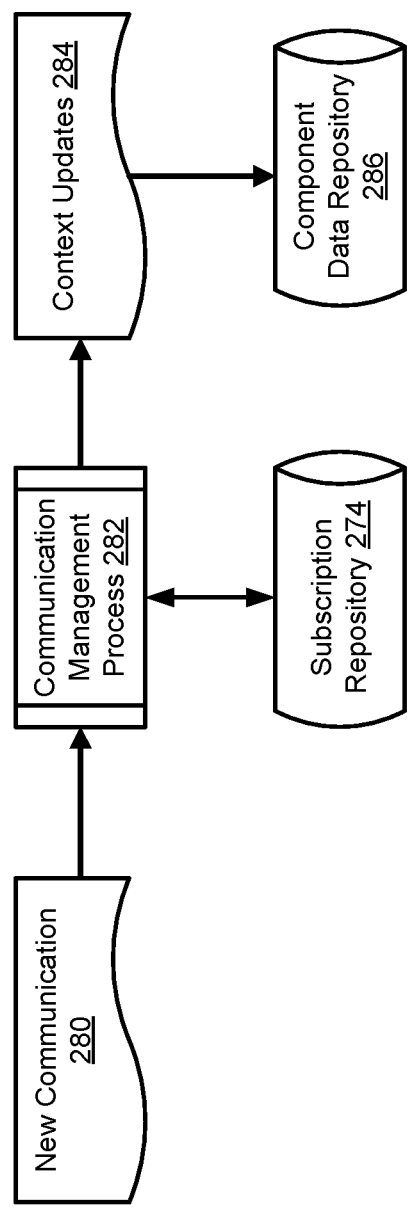

Simulated Performance Report 400

- Data Package Before Application Programming Interface (API) 1:
  1994-08-02 12:05:01, T = 35 °C

- Data Package After API 1:
  1994-08-02 12:05:01, T = 35 °C

- Data Package After API 2:
  (Data Package Missing)

Live Performance Report 402

- Data Package Before API 1:
  1994-08-02 12:05:01, T = 35 °C

- Data Package After API 1:
  1994-08-02 12:05:01, T = 35 °C

- Data Package After API 2:
  1994-08-02 12:05:01, T = 35 °C

FIG. 4

MANAGING DATA PIPELINES USING GRAPHICAL USER INTERFACES

FIELD

Embodiments disclosed herein relate generally to data management. More particularly, embodiments disclosed herein relate to systems and methods to manage data pipelines using graphical user interfaces.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A-2F show block diagrams illustrating data flows in accordance with an embodiment.

FIG. 4 shows block diagrams illustrating a system in accordance with an embodiment over time.

DETAILED DESCRIPTION

Figure 1:
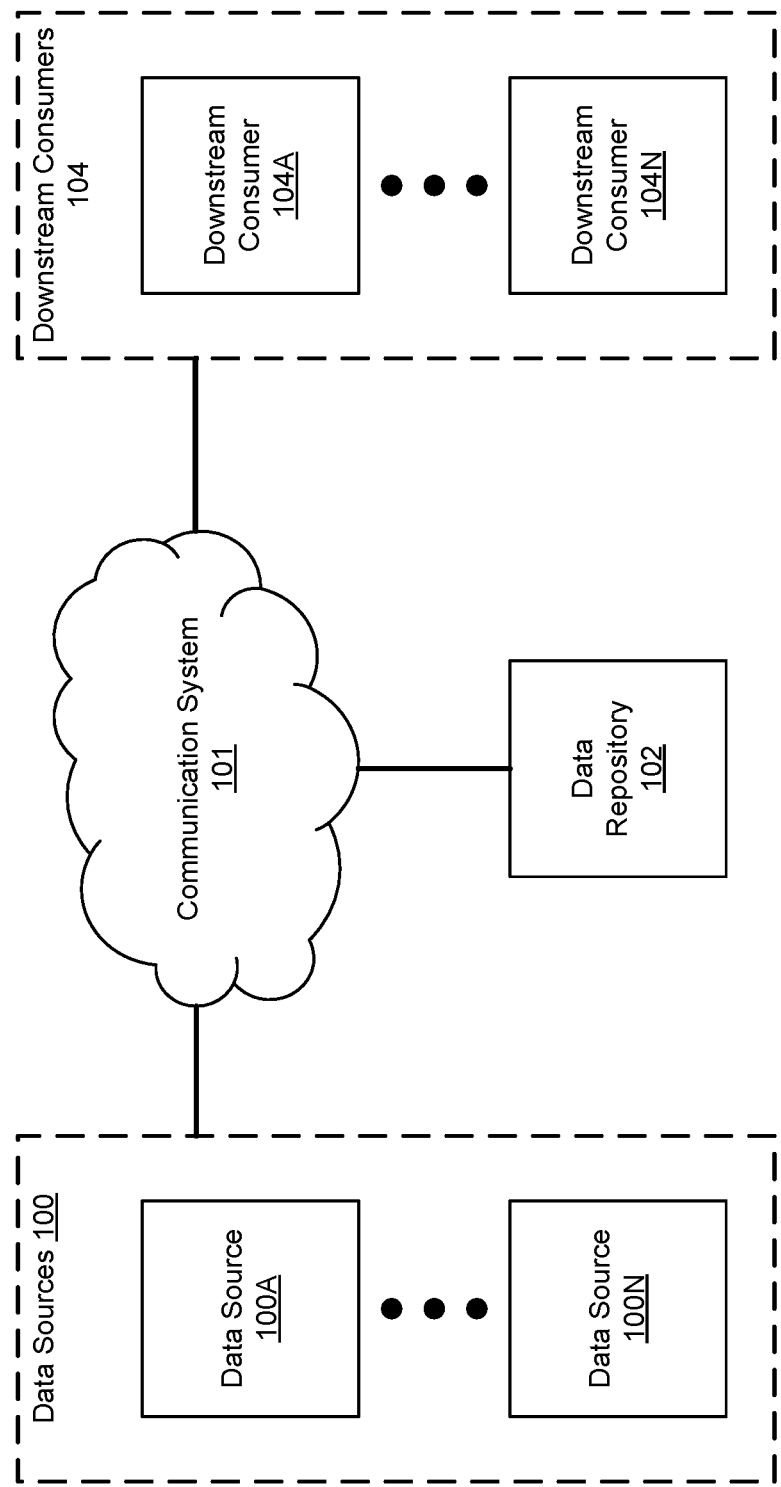
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data pipelines. Over time, portions of a data pipeline may be updated due to integration of externally developed code, data scheme updates, etc. Such updates to the data pipeline may interrupt and/or otherwise modify performance of the data pipeline (e.g., application programming interfaces (APIs) breaking, packages of data being re-formatted in a manner unusable by a downstream consumer, etc.). Such interruptions may lead to failure of the data pipeline and, therefore, unavailability of data for use by downstream consumers of the data from the data pipeline.

To reduce the likelihood of data pipeline failure following an update to the data pipeline, stakeholders may be provided with information usable to make better decisions regarding how to manage the data pipeline and updates to the data pipeline may be proactively evaluated. To proactively evaluate updates, the system may host and operate a digital twin of the data pipeline. The digital twin may duplicate operation of the data pipeline and may operate concurrently with the operation of the data pipeline (using the same data when a potential update is introduced). The system may utilize the digital twin to simulate operation of the data pipeline using the potential update prior to allowing the potential update to be implemented in the data pipeline.

By comparing performance of the digital twin (with the potential update implemented) to performance of the data pipeline using the same input data, the system may detect a performance delta. If the performance delta does not meet a threshold, the system may initiate an update process to implement the potential update in the data pipeline. If the performance delta meets the threshold, the system may deny the potential update and perform an action set to remediate the potential update. By doing so, failures of the data pipeline may be reduced as a result of updates to the data pipeline.

To provide stakeholders with information regarding the data pipeline, a graphical user interface based on the data pipeline may be used. The graphical user interface may provide stakeholders with information regarding the operation of the data pipeline as well as context for different components of the data pipeline. The stakeholders may use the provided information to make more informed decisions regarding updates to make to the data pipeline. Consequently, updates made to the data pipeline may be more likely to result in operation of the data pipeline that is more desirable to the stakeholders.

In an embodiment, a method of managing a data pipeline is provided. The method may include obtaining a graphical user interface comprising graphical representations based on the data pipeline; identifying user interest in a first graphical representation of the graphical representations; based on the user interest in the first graphical representation, adding an additional graphical representation to the graphical user interface to obtain an updated graphical user interface, the additional graphical representation being based on at least one communication regarding a component of the data pipeline represented by the first graphical representation; obtaining user input using the updated graphical user interface; and updating operation of the data pipeline based on the user input to obtain an updated data pipeline; and providing computer implemented services using the updated data pipeline.

The method may also include obtaining a second communication regarding the component; making a determination regarding whether the second communication is relevant for management of the data pipeline; in an instance of the determination where the second communication is relevant for management of the data pipeline: populating a component data repository based on the second communication to obtain an updated component data repository; and distributing updates regarding the component based on the updated component data repository and subscriptions for components of the data pipeline.

The updates may be based, at least in part, on the second communication.

The at least one communication may be stored in the component data repository.

Obtaining the second communication may include scraping an electronic mail repository for a user that is subscribed for the updates for the component.

A first portion of the graphical representations may be based on databases of the data pipeline, a second portion of the graphical representations may be based on application programming interfaces of the data pipeline, and a third portion of the graphical representation may be based on applications of the data pipeline.

The applications may use data maintained by at least a portion of the databases and that is supplied from the at least the portion of the databases by at least a portion of the application programming interfaces.

The method may also include dynamically updating the first portion of the graphical representations based on changes in schemas implemented by the databases; and dynamically updating the second portion of the graphical representations based on changes in alignment of the application programming interfaces with the schemas.

The dynamically updating of the second portion of the graphical representations may facilitate discrimination of a first portion of the application programming interfaces that are aligned with the schemas from a second portion of the application programming interfaces that are misaligned with the schemas.

The additional graphical representation may be based on communications between persons tasked with managing operation of the component, and each of the communications are relevant for management of the data pipeline.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and stored in a data repository prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data repository 102. Data repository 102 may include any number of data processing systems including hardware and/or software components configured to facilitate performance of the computer-implemented services. Data repository 102 may include a database (e.g., a data lake, a data warehouse, etc.) to store data obtained from data sources 100 (and/or other entities throughout a distributed environment).

Data repository 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data repository 102 may obtain the temperature measurements from data sources 100 as part of the data pipeline. Data repository 102 may obtain the temperature measurements via a request through an API and/or via other methods. Data repository 102 may curate the temperature data (e.g., identify errors/omissions and correct them, etc.) and may store the curated temperature data temporarily and/or permanently in a data lake or other storage architecture. Following curating the temperature data, data repository 102 may provide the temperature measurements to other entities for use in performing the computer-implemented services.

Data stored in data repository 102 may be provided to downstream consumers 104. Downstream consumers 104 may utilize the data from data sources 100 and/or data repository 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the temperature data from data repository 102 as input data for climate models. Specifically, downstream consumers 104 may utilize the temperature data to simulate future temperature conditions in various environments over time (e.g., to predict weather patterns, climate change, etc.).

To provide the computer-implemented services over time, the system may implement updates to the data pipeline (e.g., introducing externally developed code, modifying data schemes, etc.). The updates to the data pipeline may be introduced in response to changes to the needs of the downstream consumers, in response to an identification of a potential performance improvement for the data pipeline, etc.

However, implementation of the updates to the data pipeline may modify operation of at least a portion of the data pipeline. This modification may lead to unexpected interruptions to the data pipeline (e.g., unexpected transformations to data packages passing through the data pipeline and, therefore, misalignments between operation of an API and expectations of a user of the API, etc.). By the time the interruptions are identified, downstream consumers may have provided computer-implemented serviced based on incomplete and/or unusable data (and/or data may be unavailable to a downstream consumer due to a failure of an API, etc.).

Additionally, once an interruption occurs, diagnosing the root cause of the disruption, identifying the impacts of the disruption, and selecting actions to perform to remediate the disruption may be challenging due to the distributed nature of the data pipeline. For example, performing one action to update operation of the data pipeline to repair a root cause of an interruption may lead to other disruptions.

Further, due to the distributed nature and use of data pipelines, many stakeholders may be tasked with managing the operation of the data pipeline. These stakeholders may have different interests and may only have access to a limited amount of information regarding the data pipeline. Consequently, different stakeholders may come to different conclusions on how a data pipeline should operate.

In general, embodiments disclosed herein may provide methods, systems, and/or devices for (i) reducing interruptions to the data pipeline caused by updates to the data pipeline and (ii) facilitating distributed management of the data pipeline. To reduce interruptions to the data pipeline, the system of FIG. 1 may host and operate a digital twin of the data pipeline. The digital twin may duplicate operations performed by the data pipeline (e.g., data transformations, data transmission using APIs, etc.). The digital twin may operate concurrently with the data pipeline when potential updates to the data pipeline are introduced (e.g., during a continuous integration/continuous delivery process, etc.) and may simulate a flow of data using input data from the data pipeline.

When a potential update to the data pipeline is identified, the system of FIG. 1 may integrate the potential update into the digital twin of the data pipeline while allowing the data pipeline to continue operating without the potential update. The simultaneous flow of data through the data pipeline and the digital twin may allow the system to compare performance of the data pipeline to a simulated performance using the digital twin. Therefore, potential interruptions to the flow of data through the data pipeline (e.g., API failures) may be identified based on a difference between the performance of the data pipeline and the simulated performance using the digital twin.

Figure 2A:
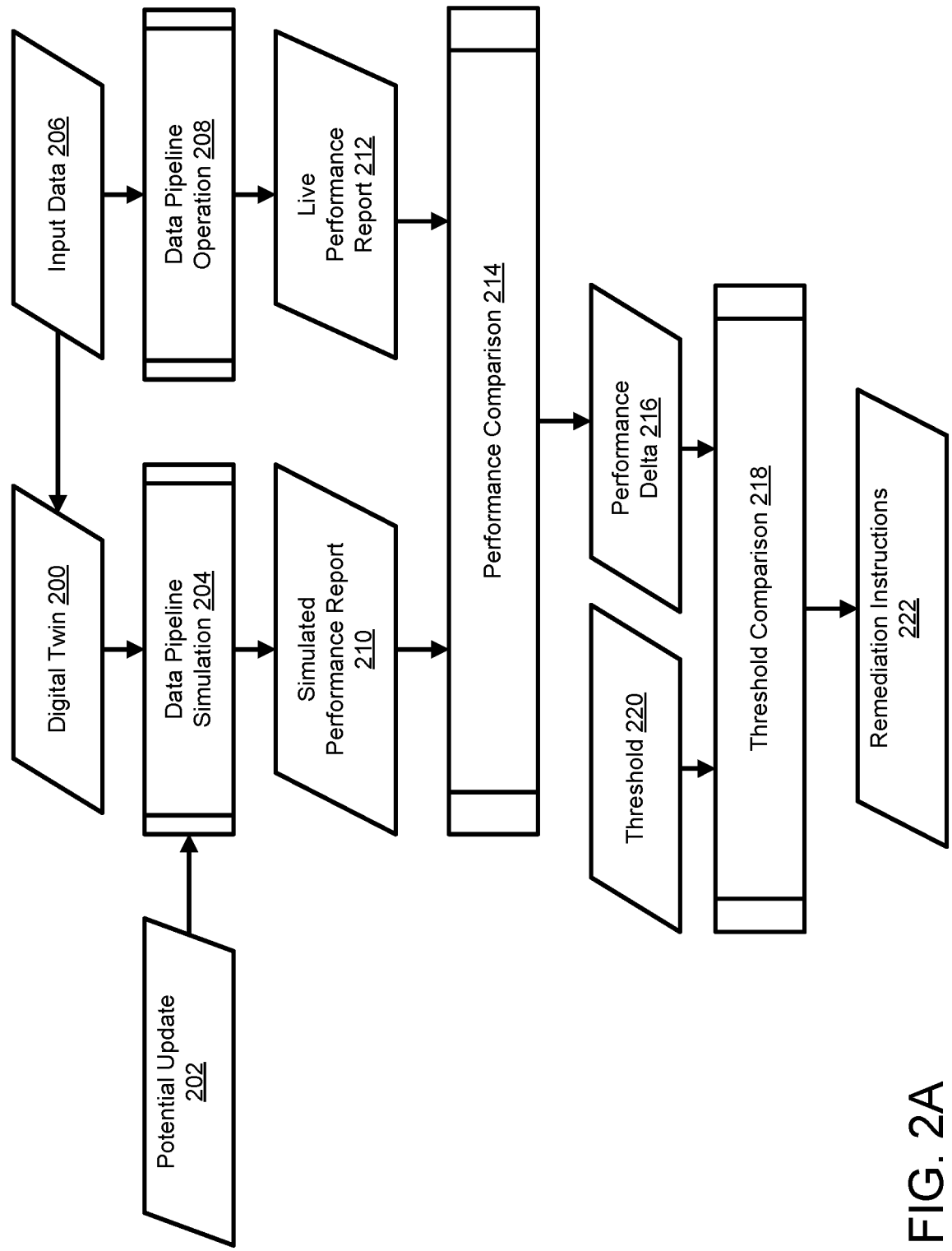

To provide the above noted functionality, the system of FIG. 1 may: (i) obtain a potential update intended to modify operation of at least a portion of the data pipeline, (ii) simulate the data pipeline using a digital twin of the data pipeline, the potential update, and input data to obtain a first simulated performance report, and/or (iii) determine, based on the first simulated performance report and the first live performance report, whether the data pipeline will become misaligned by implementation of the potential update. If the data pipeline will not become misaligned by implementation of the potential update, the system may initiate an update process for the data pipeline based on the potential update to obtain an updated data pipeline. If the data pipeline will become misaligned by implementation of the potential update, the system may: (i) deny the potential update for implementation in the data pipeline, and/or (ii) perform an action set to remediate the potential update. Refer to FIG. 2A for additional details regarding evaluation of potential updates to data pipelines.

To facilitating distributed management of the data pipeline. (i) information regarding the operation of the data pipeline may be collected, (ii) information from different stakeholders regarding management of the data pipeline may be collected, (iii) the collected information may be used to generate graphical user interfaces through which different stakeholders may obtain a more complete view of operation of the data pipeline and information regarding the views of other stakeholders, and (iv) updates to the data pipeline may be made based on user input obtained through the graphical user interfaces. Refer to FIGS. 2B-2F for additional details regarding use of graphical user interfaces in management of data pipelines.

When performing its functionality, data sources 100, data repository 102, and/or downstream consumers 104 may perform all, or a portion, of the methods and/or actions shown in FIGS. 2-3.

Data sources 100, data repository 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data sources 100, data repository 102, and/or downstream consumers 104 are implemented using an internet of things (IoT) device, which may include a computing device. The IoT device may operate in accordance with a communication model and/or management model known to data sources 100, data repository 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating data flows and/or processes performed in a system in accordance with an embodiment is shown in FIG. 2A.

FIG. 2A shows a block diagram illustrating data flow during evaluation of a potential update to a data pipeline using a digital twin in accordance with an embodiment. The processes shown in FIG. 2A may be performed by any entity shown in the system of FIG. 1 (e.g., a data source similar to data source 100A, a data repository similar to data repository 102, a downstream consumer similar to downstream consumer 104A, etc.) and/or another entity without departing from embodiments disclosed herein.

Consider a scenario in which a data pipeline (not shown) runs in parallel (e.g., concurrently using identical data) to a digital twin of the data pipeline (e.g., digital twin 200) following an identification of potential update 202. Digital twin 200 may include a data structure with instructions to duplicate operation of the data pipeline under a range of possible environmental conditions and/or other scenarios.

Potential update 202 may include a modification to operation of at least a portion of the data pipeline (e.g., a code change, a data scheme change, etc.). Prior to implementing potential update 202 in the data pipeline, potential update 202 may be implemented in digital twin 200. To identify any potential interruptions (e.g., failure of the data pipeline due to an API break, etc.) to the operation of the data pipeline as a result of potential update 202, data pipeline simulation 204 process may include simulating an updated version of the data pipeline using digital twin 200, potential update 202, and input data 206.

Input data 206 may include data obtained from one or more data sources (e.g., similar to any of data sources 100 shown in FIG. 1) and intended to be inputted to the data pipeline. Therefore, data pipeline operation 208 process may occur simultaneously with data pipeline simulation 204 process and data pipeline operation 208 process may also utilize input data 206. Specifically, data pipeline operation 208 process may include: (i) transformations to input data 206 as needed, (ii) storing input data 206 in a data repository, (iii) providing input data 206 to a downstream consumer, etc. However, data pipeline operation 208 process may not include potential update 202.

The introduction of potential update 202 into digital twin 200 may initiate generation of simulated performance report 210 as a result of data pipeline simulation 204 process and live performance report 212 as a result of data pipeline operation 208 process.

Simulated performance report 210 may include data related to a progression of a data package (not shown) of input data 206 through digital twin 200 while incorporating potential update 202. Simulated performance report 210 may include, for example, a data structure listing the format of the data package at different stages of digital twin 200. Specifically, simulated performance report 210 may include a listing of records associated with input data 206, each record of the listing of the records including: (i) a first format of the data package prior to encountering an API associated with digital twin 200, and (ii) a second format of the data package after encountering the API. Consequently, every time the data package passes through an API (e.g., transmission from the data repository to the downstream consumer), the format of the data package and/or metadata related to the data package may be recorded in the data structure. By doing so, any failure of the data pipeline (e.g., due to a misalignment between operation of the API and expectations for the operation of the API) may appear in simulated performance report 210 as a missing data package, etc.

Similarly, live performance report 212 may follow the same data package of input data 206 as it progresses through the data pipeline. Live performance report 212 may include a data structure with entries corresponding to entries in simulated performance report 210. Therefore, the format of the data package (and/or other characteristics of the data package) may be compared as it progresses through digital twin 200 and the data pipeline. By doing so, any potential undesirable modifications to the data package as a result of the implementation of potential update 202 (e.g., a formatting change that makes the data package unusable, a broken API, etc.) may be identified.

Performance comparison 214 process may include comparing simulated performance report 210 and live performance report 212. For example, performance comparison 214 process may include identifying an API failure (and/or other disruptions) indicated by simulated performance report 210. In addition, performance comparison 214 process may include comparing corresponding entries in simulated performance report 210 and live performance report 212 to identify formatting changes and/or other changes that may be the result of potential update 202.

Performance comparison 214 process may include generating performance delta 216. Performance delta 216 may include a data structure indicating a difference identified between simulated performance report 210 and live performance report 212. The difference may include: (i) an indicator of a failure of an API, (ii) a quantification of a formatting change between the second format of the data package from simulated performance report 210 and a corresponding second format of the data package from live performance report 212, and/or (iii) any other differences between other aspects of simulated performance report 210 and live performance report 212. For example, the quantification of the formatting change may include a percent difference between formatting of the data package in simulated performance report 210 and formatting of the data package in live performance report 212.

The data pipeline may fail if, for example, an API failure occurs due to performance delta 216. To determine whether performance delta 216 includes an indicator of data pipeline failure, threshold comparison 218 process may compare performance delta 216 to threshold 220. Threshold 220 may include any quantification of the difference in performance delta 216 considered acceptable (e.g., based on needs of a downstream consumer, and/or any other criteria). Threshold 220 may indicate, for example, that no API breaks are considered acceptable. In addition, threshold 220 may indicate that the data pipeline has become misaligned when met and the data pipeline becoming misaligned may cause failure of the data pipeline.

If performance delta 216 meets threshold 220, threshold comparison 218 process may result in generation of remediation instructions 222. Remediation instructions 222 may include, for example, an indication of a portion of the data pipeline that may be interrupted by potential update 202. Remediation instructions 222 may be provided to any entity responsible for modifying potential update 202 to account for the potential interruptions. Consequently, remediation instructions 222 may facilitate implementation of potential update 202 while avoiding potential interruptions and/or other issues throughout the data pipeline.

If performance delta 216 does not meet threshold 220, the system may implement potential update 202 into the data pipeline. Following implementation of potential update 202 into the data pipeline, the system may continue to monitor operation of the data pipeline via generation of a second live performance report and a second simulated performance report (not shown). The second live performance report may be based on operation of the data pipeline following implementation of potential update 202 for a duration of time. The second simulated performance report may be based on continued operation of the digital twin for the duration of time (also using potential update 202).

A second performance delta may be obtained (not shown) using the second live performance report and the second simulated performance report. The second performance delta may be compared to threshold 220. An operational status of digital twin 200 may be obtained based on the comparison (not shown). The operational status may indicate a degree to which digital twin 200 accurately duplicates the operation of the data pipeline following implementation of the potential update. The operational status may be used, for example, to make further modifications to potential update 202 (if needed) and/or to diagnose potential operational issues for digital twin 200.

In an embodiment, the one or more entities performing the operations shown in FIG. 2A are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

To manage data pipelines, multiple stakeholders may cooperate to decide on how to update the operation of the data pipeline over time. These stakeholders may include (i) developers tasked with updating code and/or data structures, (ii) regulatory compliance officials tasked with ensuring that the data pipeline operates in accordance with government and/or private regulations, (iii) business unit managers that rely on computer implemented services provided by entities that consume data managed by the data pipeline, and/or other persons. Any of these stakeholders may have similar and/or different interests with respect to the data pipeline, and may need to coordinate with one another to make collective decisions regarding how to manage the data pipeline.

To coordinate how to manage data pipelines, graphical user interfaces may be used to (i) enhance stakeholder understanding of operation of the data pipeline, (ii) share information regarding interests in the data pipeline, (iii) make collective decisions, and/or otherwise facilitate management of the data pipelines.

Figure 2B:
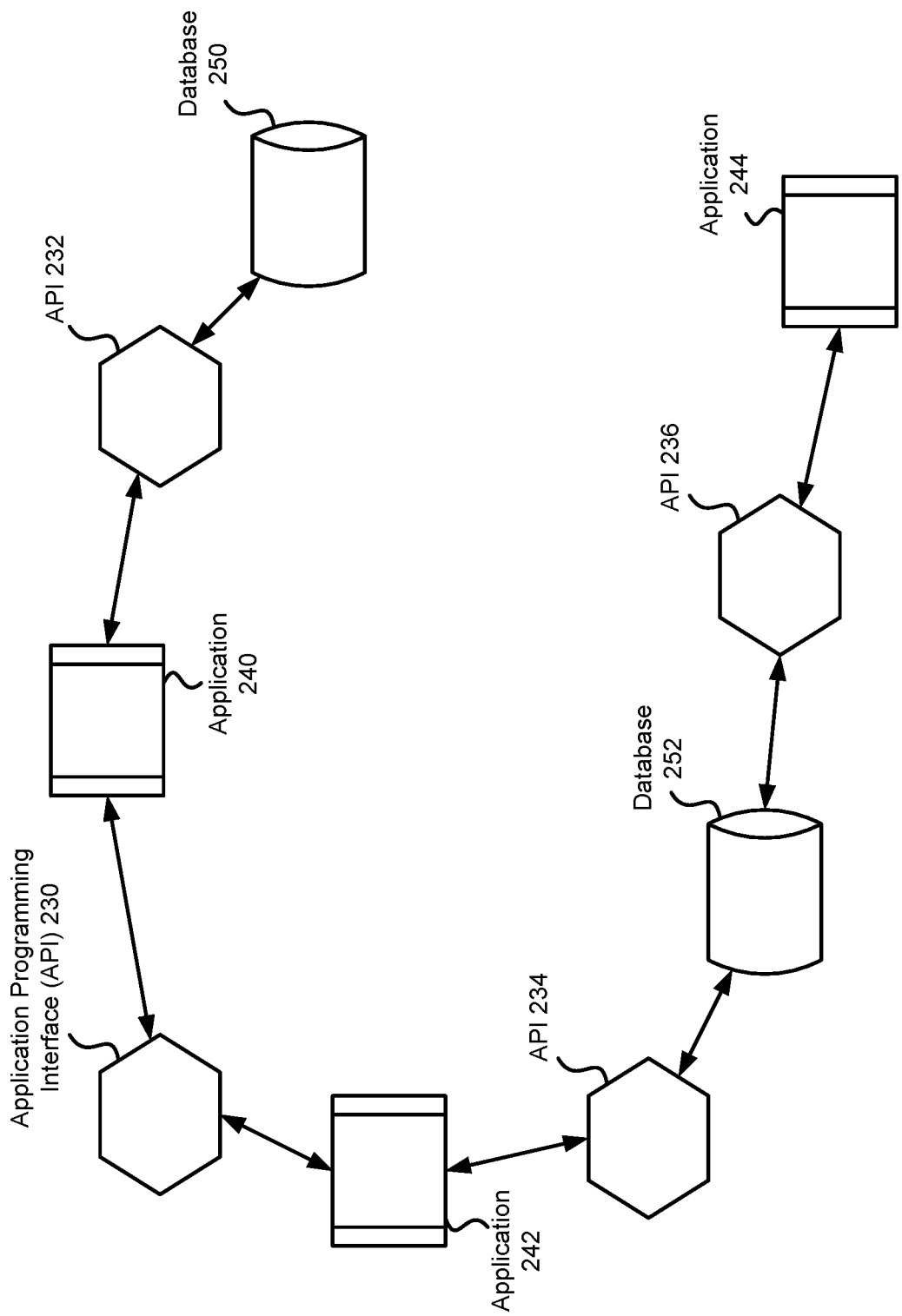
Figure 2C:
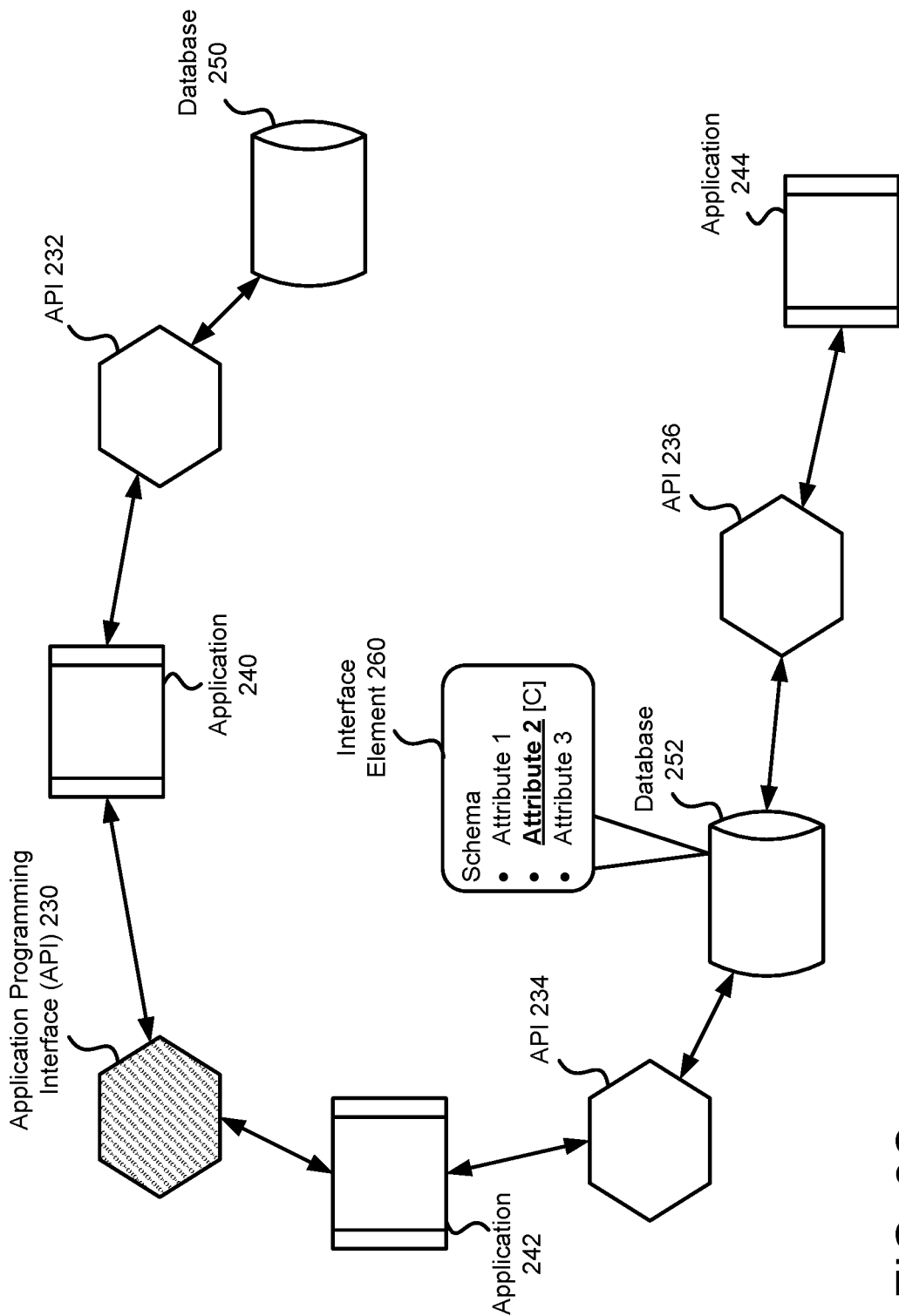
Figure 2D:
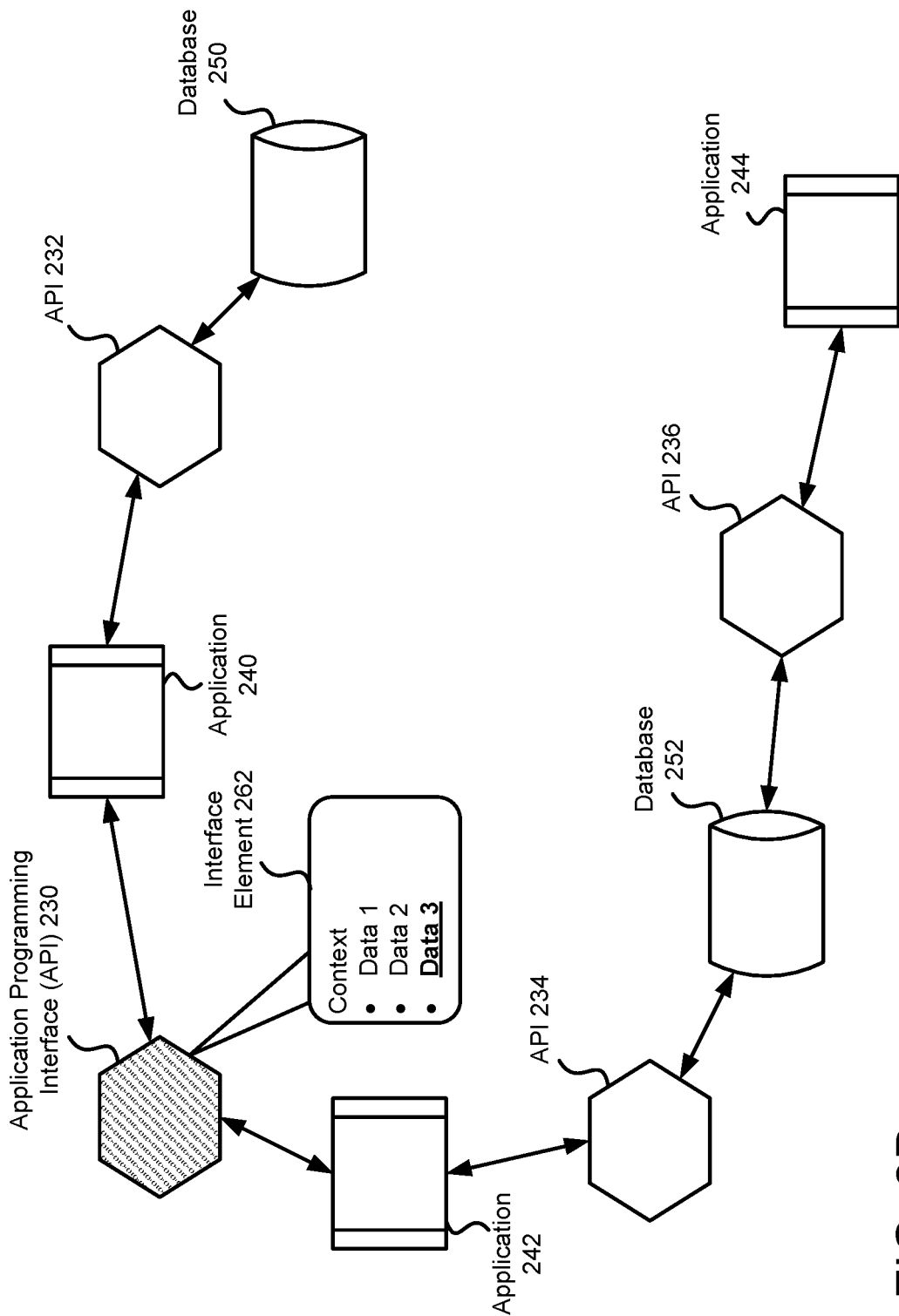
Figure 5:
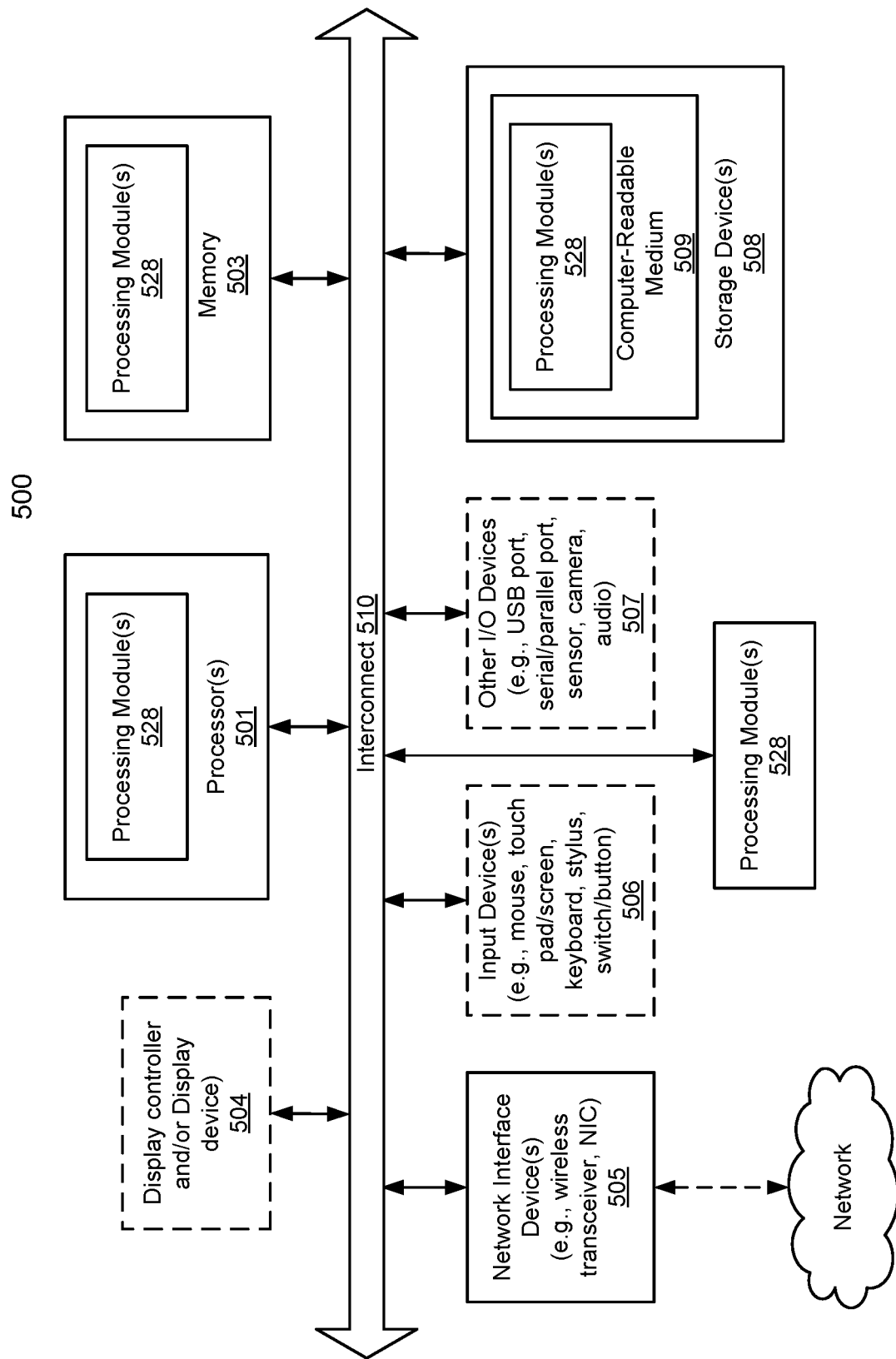
FIG. 5 shows a block diagram illustrating a data processing system in accordance with an embodiment.

Turning to FIGS. 2B-2D, diagrams illustrating graphical user interfaces in accordance with an embodiment are shown. The graphical user interfaces may be generated by and presented to the stakeholders using any number of computing devices. Refer to FIG. 5 for additional details regarding computing devices. When doing so, the computer devices may utilize various data repositories that include information regarding the operation of data pipelines, communications relevant to operation of the data pipelines, and/or other information. Refer to FIGS. 2E-2F for additional details regarding information on which the graphical user interfaces may be based.

Turning to FIG. 2B, a first diagram of an example graphical user interface in accordance with an embodiment is shown. The graphical user interface may include any number of graphical representations (e.g., 230-250) that may reflect different portions of the data pipeline and/or entities that may utilize data from the data pipeline. In FIGS. 2B-2D, a first shape (e.g., 230-236) is used to represent instances of application programming interfaces, a second shape (e.g., 240-244) is used to represent instances of applications, a third shape (e.g., 250-252) is used to represent databases, and a fourth shape (e.g., 260-262) is used to represent additional graphical elements used to convey information regarding the data pipeline to users.

To convey information regarding the operation of data pipelines, the graphical user interface may include graphical representations corresponding to components of the data pipeline and flows of data between these components. The graphical representations corresponding to the components may include different shapes for different types of components, as seen in FIG. 2B. The graphical representations corresponding to flows of data between these components may include lines terminating in arrows interconnecting the graphical representations corresponding to the components.

For example, in FIG. 2B, database 250 may be connected to API 232 via a line terminating in arrows, and API 232 may be connected to application 240 via a line terminating in arrows. These representations may indicate that data maintained in database 250 may flow to application 240 via API 232.

In another example, application 240 is connected to application 242 via API 230. These representations may indicate that data from either application may be provided to the other application via API 230.

When misalignment between the applications, APIs, and databases of the data pipeline occur, consumers of data (e.g., applications) may be deprived (e.g., through inability to retrieve the data, through data corruption, etc.) of access to data otherwise supplied by the data pipeline. When such misalignments occur, the stakeholders tasked with managing the operation of the data pipeline may be tasked with deciding how to update operation of the data pipeline. These decisions may be proactively evaluated via the process illustrated in FIG. 2A and method discussed below with respect to FIG. 3A. However, the stakeholders may need to decide on how to modify the data pipeline prior to evaluation. As will be discussed below, the stakeholders may use the graphical user interface to make such decisions.

Turning to FIG. 2C, a second diagram of an example graphical user interface in accordance with an embodiment is shown. The second diagram may illustrate an update that is automatically made to the graphical user interface when an example misalignment in the data pipeline occurs. In this example, the misalignment may be between database 252 and API 230. The misalignment may be a change in how an attribute of a schema used by database 252 is implemented. The change in attribute may have improved efficiency in storage of data in database 252, or for other reasons. However, the change may modify the data subsequently distributed through API 230 in a manner that prevents the data from being distributed to application 240. Consequently, until the misalignment is corrected, application 240 may be unable to use desired data from database 252.

To facilitate cooperative decision making, an automation layer implemented by the data pipeline may continuously monitor operation of the data pipeline to identify misalignments. When detected, changes previously made to the data pipeline may be correlated with the misalignments. In this case, the change made to the schema that resulted in misalignment with API 230.

To convey this information to the stakeholders, the graphical user interface may be updated. The updates may include (i) changes in the graphical representations for the different components and (ii) additional graphical representations.

For example, to convey to the stakeholders that API 230 is misaligned with database 252, the graphical representation for API 230 may be modified to highlight it. For example, the color, outline, and/or other characteristics of the graphical representation may be changed. In this example, the in-fill pattern has been changed to allow it to be easily discriminated from other graphical representations for other components of the data pipeline.

In another example, to convey the specific changes made to the stakeholders that precipitated the misalignment, interface element 260 may be dynamically generated and added to the graphical user interface. Interface element 260 may be implemented with, for example, a popup or other graphical representation. Interface element 260 may be positioned with and have a shape that indicates an associate with database 252, so that a viewer of the graphical user interface understands that content of interface element 260 relates to database 252.

Interface element 260 may include content that allows stakeholders to understand changes made to database 252 that precipitated the misalignment. For example, interface element 260 may include a textual (e.g., human readable) description of the schema (e.g., system of organization and/or representation of information) implemented by database 252.

The content may also be highlighted to indicate portions of the schema that have been modified as part of the change precipitating the misalignment. For example, in this example, the schema may include attributes and the second attribute may have changed. To highlight this change, the text corresponding to the attribute may be bolded, underlined, etc. Additionally, other characters (e.g., "[C]") may be appended to the text to further highlight the changes to the stakeholder. It will be appreciated that other modalities may be used to highlight changes made to the schema without departing from embodiments disclosed herein.

The combination of changes in graphical representation and addition of other graphical representations (e.g., 260) may allow the stakeholders that view the graphical user interface to come to a shared understanding of the condition of the data pipeline. However, to come to a shared agreement on how to modify the operation of the data pipeline, additional information may need to be made available via the graphical user interface.

For example, due to the divergent interests of the stakeholders, different stakeholders may come to different decisions based on the same condition of the data pipeline. To facilitate cooperative decision making, additional information may be aggregated and integrated into the graphical user interface.

Turning to FIG. 2D, a third diagram of an example graphical user interface in accordance with an embodiment is shown. The third diagram may illustrate an update that is made to the graphical user interface when users interact with various graphical representations corresponding to components of the data pipeline. For example, a user may position a cursor with a graphical representation to show user interest in the graphical representation and corresponding component. Similarly, while so positioned, a user may actuate a button or other control to indicate selection of the graphical representation.

When user interest is directed to a graphical element corresponding to a component, an additional graphical representation may be automatically added to the graphical user interface. The added graphical representation may be positioned with, shaped, and/or otherwise adapted to indicate an associated with the graphical representation at which the user interest is directed.

For example, when a user interest is identified as being directed to API 230, interface element 262 may be dynamically added to the graphical user interface. Like interface element 260, interface element 262 may include content usable to convey information regarding API 230 to the stakeholders.

In contrast to interface element 262 that included content regarding changes that precipitated the misalignment, the content of interface element 262 may include context for API 230. The context may be based on communications between the stakeholders regarding API 230. The communications may include electronic mail communications, instant messaging communications, forum posts, and/or other types of communications regarding API 230. The communications may also be through user input directly provided via the user interface (e.g., such as through selecting interface element 262, or a portion thereof, which may allow a user to add a comment).

The content of interface element 262 may be obtained through processing of any of these types of communications. For example, electronic mail, instant messaging, and/or other types of applications used by the stakeholders may be scraped for communications deemed relevant to components of the data pipeline. Refer to FIG. 2F for additional details regarding processing of communications.

Through processing of the communications, the content of interface element 262 may be obtained. The content may reflect, for example, a historical log of different communications regarding API 230.

In this manner, a rich context for decision making regarding API 230 may be established and made available to different stakeholders. The context may include information from multiple stakeholders thereby allowing diverse interests among the stakeholders to be brough to discussion and reconciled. Consequently, considerations relevant to the stakeholders may be considered by all of the stakeholders.

To improve the likelihood of the context for different components of the data pipeline being taken into account by different stakeholders, an information distribution system may be implemented. The information distribution system may automatically alert stakeholders to changes in context for different components.

For example, communications regarding changes in context may be provided to the stakeholders as the context is updated over time. Additionally, when a stakeholder initiates use of the graphical user interface, any interface elements that include new context that has not been previously viewed by a stakeholder may be discriminated to the stakeholder. For example, the interface elements may be automatically added to the graphical user interface, and the specific portion of the context not previously viewed by the stakeholder (e.g., "data 3" bolded and underlined to indicate that it has not been previously viewed by a stakeholder) may be highlighted. Accordingly, the stakeholder may be efficiently notified of changes in context for different components of the data pipeline.

For example, if another stakeholder adds a comment regarding API 230, the comment may be highlighted for review by the stakeholder when the stakeholder next opens the graphical user interface. The highlighting may be retained until criteria is met (e.g., user interest has been directed to the highlighted portion of the context).

Use the context provided by the interface elements, the stakeholders may come to a decision regarding how to update operation of the data pipeline. Once the decision is made, the corresponding components of the data pipeline may be modified. To do so, a user may direct user interest to a corresponding graphical representation. When directed, a popup menu or other interactive element may be presented to confirm that the corresponding component is to be modified. If confirmed, the code, schema, or other control elements for the component may be automatically opened for editing by the user. Once updated, the user may save the changes.

Information regarding the changes made to the component may be added to the context for the component. Consequently, a log reflecting the decision making process and changes made to a component based on the decision making process may be established.

To implement the graphical user interface, various data structures may be implemented and processes may be performed, as described with respect to FIGS. 2E-2F, below.

Turning to FIGS. 2E-2F, data flow diagrams in accordance with an embodiment are shown. In the diagrams, data structures are illustrated using a first set of shapes (e.g., 272, 278), processes performed using the data structures and/or through which new data structures are generated are illustrated using a second set of shapes (e.g., 270, 276), and large scale data structures are illustrated using a third set of shapes (e.g., 274, 286).

Turning to FIG. 2E, a second data flow diagram in accordance with an embodiment is shown. The second data flow diagram may illustrate data structures used and processing performed to distribute information regarding changes in context for components of a data pipeline.

To distribute information regarding changes in context for components of a data pipeline, component data repository 286 may be monitored by monitoring process 270. Component data repository 286 may include the context for components of a data pipeline. The content of component data repository 286 may be updated as the context for the components of the data pipeline is updated. Monitoring process 270 may track changes to the context for different components and generate pipeline component changes (e.g., 272) based on the changes.

The pipeline component changes may be ingested by change management process 276. During change management process 276, notifications 278 may be generated and sent to stakeholders that are subscribed to changes in different components of a data pipeline. The subscriptions may be recorded in subscription repository 274.

When a pipeline component change is ingested by change management process 276, the components impacted by the changes in context may be identified. The stakeholders subscribed to those components may be identified using the subscriptions recorded in subscription repository 274. The notifications 278 may be generated and sent to the subscribed stakeholders. The notifications may indicate that changes to the context for the subscribed to components have been made, and/or may include information regarding the changes in the context.

The notifications may be distributed, for example, using electronic mail, instant messaging, and/or other mediums of communication.

Turning to FIG. 2F, a third data flow diagram in accordance with an embodiment is shown. The third data flow diagram may illustrate data structures used and processing performed to update context for components of a data pipeline.

To update context for component of a data pipeline, communications from stakeholders subscribed to components of the data pipeline may be obtained and processed. For example, new communication 280 may be obtained by scraping email repositories for subscribed stakeholders.

Once obtained, new communication 280 may be ingested by communication management process 282. During communication management process 282, the communication may be analyzed to identify relevancy to components of a data pipeline. The relevancy may be identified by matching keyswords and/or terms to components. Such associations may be retained in subscription repository 274, or other locations.

If identified as relevant, context updates 284 may be generated and used to update component data repository 286. The context updates may include additional information for contexts for the components. For example, the content of context updates 284 may be added to component data repository 286, and associated with the corresponding components. Consequently, when a graphical user interface is operating, the updated context for the components may be used.

Figure 3A:
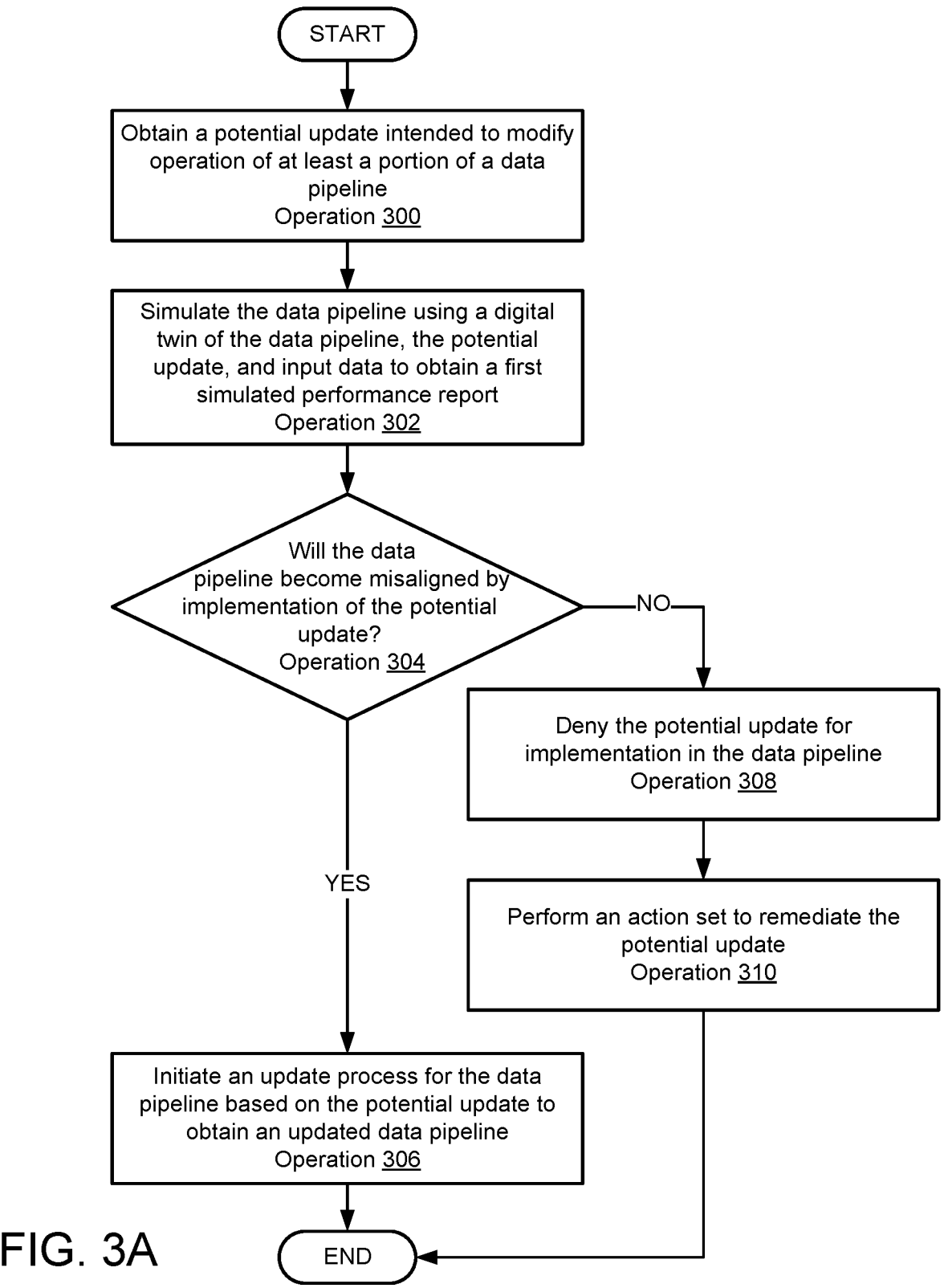
FIGS. 3A-3C show flow diagrams illustrating methods in accordance with an embodiment.
Figure 3B:
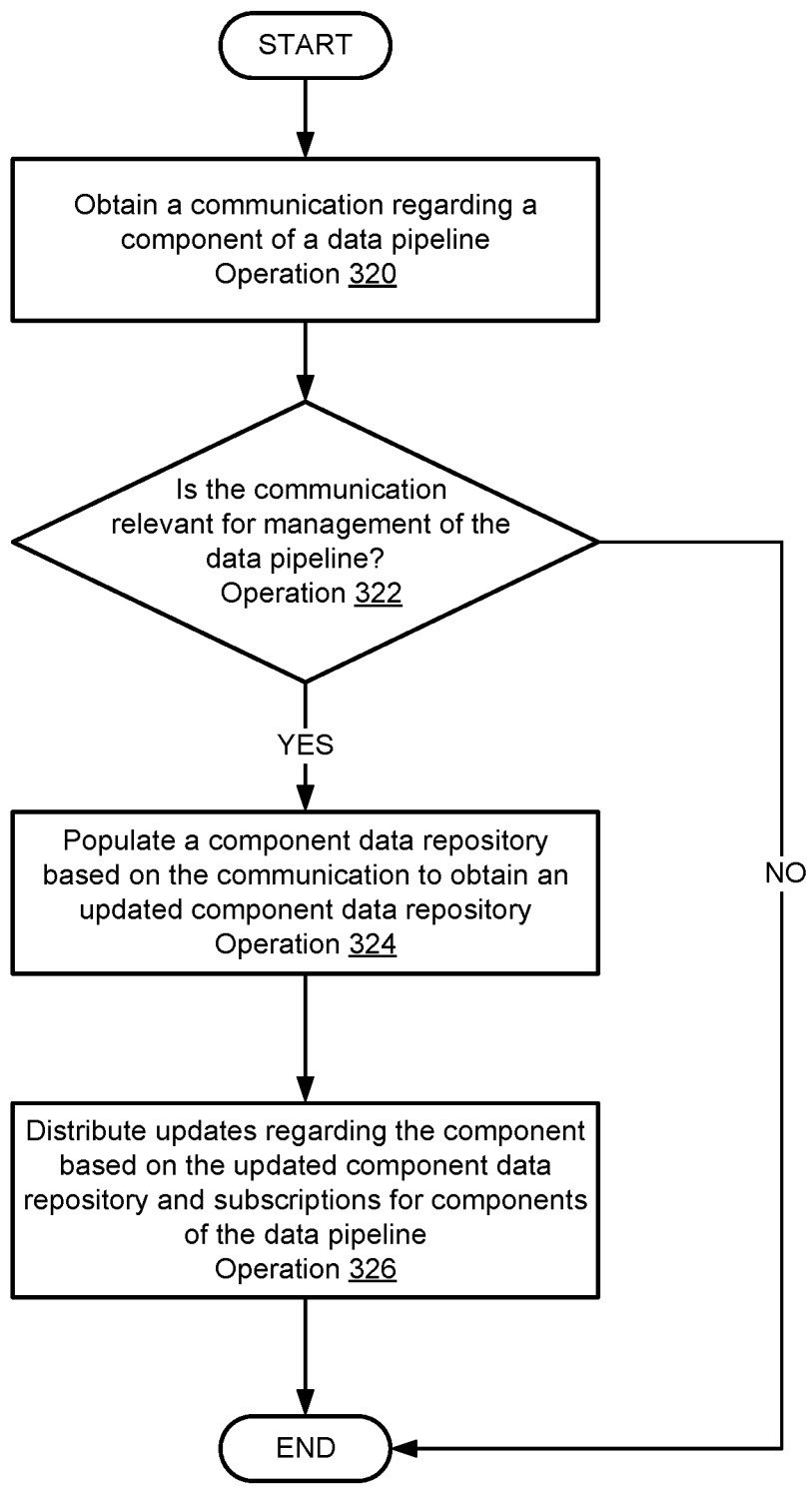
Figure 3C:
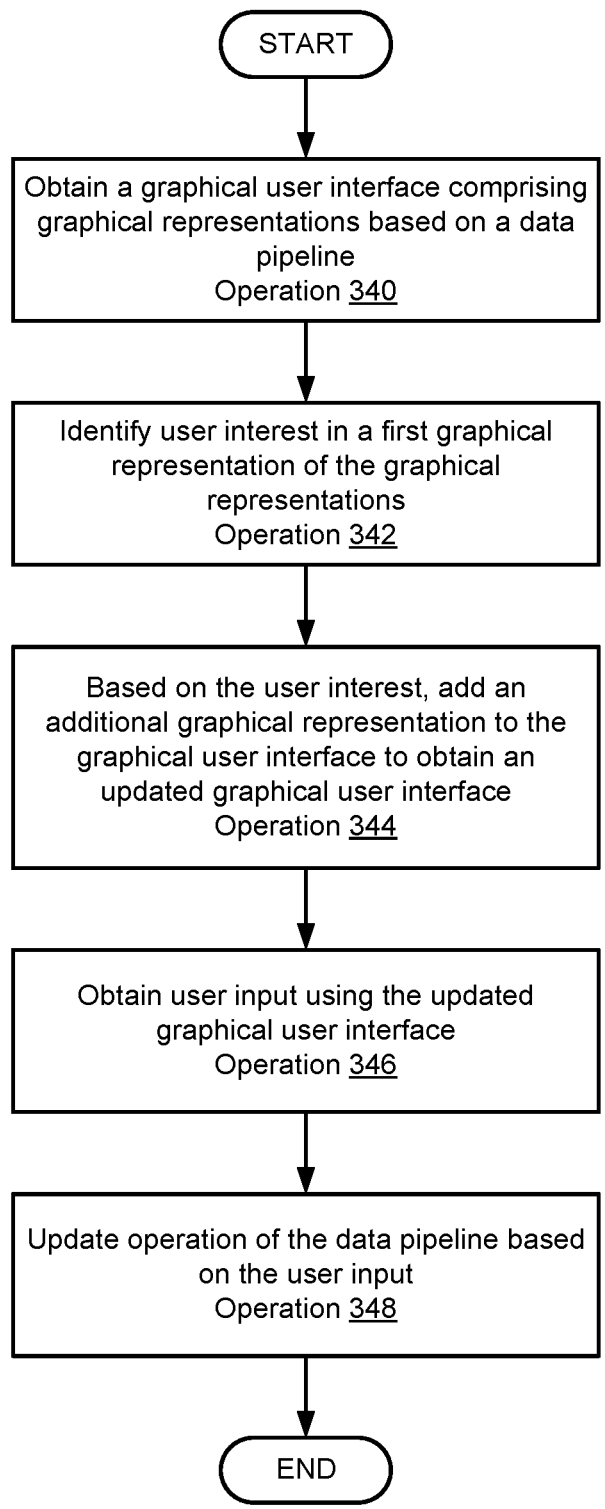

As discussed above, the components of FIG. 1 may perform various methods to manage operation of data processing systems throughout a distributed environment. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of managing a data pipeline in accordance with an embodiment is shown. The method may be performed, for example, by a data source, data repository, downstream consumer, and/or any other entity.

At operation 300, a potential update intended to modify operation of at least a portion of a data pipeline is obtained.

The potential update may be obtained by: (i) reading the potential update from storage, (ii) generating the potential update, (iii) receiving the potential update as a transmission from an entity responsible for generating potential updates, (iv) by using the method shown in FIG. 3C, and/or (iv) other methods.

At operation 302, the data pipeline is simulated using a digital twin of the data pipeline, the potential update, and input data to obtain a first simulated performance report.

Simulating the data pipeline may include: (i) modifying operation of at least a portion of the digital twin using the potential update to obtain an updated digital twin, (ii) utilizing the input data for the operation of the updated digital twin, and/or (iii) other actions.

Modifying the operation of at least the portion of the digital twin using the potential update may include: (i) implementing a change (e.g., a code change, a data scheme change, etc.) to the digital twin, the change being indicated by the potential update, (ii) providing the potential update to another entity responsible for implementing the change, and/or (iii) other methods.

Implementing the change may include: (i) modifying the contents of a data structure including instructions for implementing software associated with the digital twin using the potential update, (ii) transmitting the potential update to another entity responsible for implementing updates to the digital twin, and/or (iii) may include other actions without departing from embodiments disclosed herein.

Simulating the data pipeline may also include initiating, in response to obtaining the updated digital twin, generation of: (i) the first simulated performance report by the updated digital twin, and/or (ii) the first live performance report by the data pipeline.

Initiating generation of the first simulated performance report may include: (i) providing instructions to the digital twin to initiate generation of the first simulated performance report, (ii) providing instructions to another entity to initiate the generation of the first simulated performance report, (iii) generating the first simulated performance report, and/or (iv) other methods.

Generating the first simulated performance report may include: (i) generating a data structure to be treated as the first simulated performance report, (ii) obtaining the first format of the data package from the digital twin, (iii) encapsulating the first format in the data structure, (iv) obtaining the second format of the data package from the digital twin, (v) encapsulating the second format in the data structure, and/or (vi) other actions.

Initiating I generation of the first live performance report may include: (i) providing instructions to the data pipeline to initiate generation of the first live performance report, (ii) providing instructions to another entity to initiate the generation of the first live performance report, (iii) generating the first live performance report, and/or (iv) other methods.

Generating the first live performance report may include operations similar to those described above with respect to the first simulated performance report using the input data and the data pipeline.

At operation 304, it is determined whether the data pipeline will become misaligned by implementation of the potential update based on the first simulated performance report and the first live performance report. Determining whether the data pipeline will become misaligned by implementation of the potential update may include: (i) identifying at least one performance delta between the operation of the updated digital twin and the operation of the data pipeline, (ii) comparing the at least one performance delta to a threshold, the threshold indicating that the data pipeline has become misaligned when met, and/or (iii) other methods.

Identifying the at least one performance delta may include: (i) obtaining a difference based on the second format of the data package from the first simulated performance report and a corresponding second format of the data package from the first live performance report, and/or (ii) other actions to identify other forms of the at least one performance delta without departing from embodiments disclosed herein.

Obtaining the difference may include: (i) obtaining the second format of the data package from the first simulated performance report, (ii) obtaining the second format of the data package from the first live performance report, (iii) quantifying a degree of deviation between the second format of the data package from the first simulated performance report and the second format of the data package from the first live performance report (e.g., a percent difference, etc.), and/or (iv) encapsulating the degree of deviation in a data structure and treating the data structure as the difference.

Obtaining the difference may also include identifying an indicator that an API has failed. Identifying that an API has failed may include failing to obtain the second format of the data package from the first simulated performance report.

Comparing the performance delta to the threshold may include: (i) obtaining the threshold, (ii) comparing the difference to the threshold, and/or (iii) other actions.

Obtaining the threshold may include: (i) reading the threshold from storage, (ii) requesting the threshold from another entity responsible for generating and/or storing thresholds, (iii) generating the threshold based on preferences of a downstream consumer, and/or (iv) other methods.

Comparing the difference to the threshold may include: (i) determining whether any API failures are indicated by the difference, (ii) providing the difference and the threshold to another entity responsible for comparing the difference to the threshold, and/or (iii) other actions.

If the data pipeline will not become misaligned by implementation of the potential update, the method may proceed to operation 306.

At operation 306, an update process for the data pipeline is initiated based on the potential update to obtain an updated data pipeline.

Initiating the update process may include: (i) initiating implementation of the potential update into the data pipeline, (ii) continuing concurrent operation of the updated data pipeline and the updated digital twin, (iii) monitoring the operation of the updated data pipeline for a duration of time, and/or (vi) other actions without departing from embodiments disclosed herein.

Initiating implementation of the potential update into the data pipeline may include: (i) modifying software and/or one or more data structures to reflect the potential update, (ii) providing the potential update to another entity along with instructions for implementing the potential update into the data pipeline, (iii) re-routing at least a portion of the data pipeline through at least a portion of the updated digital twin (e.g., via modifying one or more communication channels), and/or (iv) other methods.

Monitoring the operation of the updated data pipeline for the duration of time may include: (i) obtaining a second live performance report for the data pipeline for the duration of time, (ii) comparing the second live performance report to a second simulated performance report to obtain a second performance delta, the second simulated performance report being based on the continued operation of the digital twin for the duration of time, and/or (iii) comparing the second performance delta to the threshold to obtain an operational status for the digital twin.

The second live performance report may be obtained using methods similar to those described above with relation to the first live performance report in operation 302.

Comparing the second live performance report to the second simulated performance report to obtain the second performance delta may be performed via methods similar to those described above with respect to the first performance delta in operation 304.

Comparing the second performance delta to the threshold to obtain an operational status for the digital twin may include: (i) determining whether the second performance delta meets the threshold, (ii) if the second performance delta meets the threshold, generating an operational status indicating non-nominal operation of the digital twin, and/or (iii) if the second performance delta does not meet the threshold, generating an operational status indicating nominal operation of the digital twin.

Obtaining the operational status of the digital twin may include other operations and may be based on other data without departing from embodiments disclosed herein.

The method may end following operation 306.

Returning to operation 304, the method may proceed to operation 308 if the data pipeline will become misaligned by implementation of the potential update.

At operation 308, the potential update is denied for implementation in the data pipeline. Denying the potential update for implementation in the data pipeline may include: (i) not initiating modification of the data pipeline using the potential update, (ii) providing instructions to another entity not to utilize the potential update to modify the data pipeline, (iii) modifying a data structure associated with the potential update to indicate that the potential update is not approved for implementation, and/or (iv) other methods.

At operation 310, an action set is performed to remediate the potential update.

Performing the action set to remediate the potential update may include: (i) modifying the potential update (e.g., via updating the data structure associated with the potential update to avoid the source of the undesirable first performance delta, etc.), (ii) providing instructions to another entity to modify the potential update based on the first performance delta, (iii) obtaining an updated potential update based on the potential update and the first performance delta, (iv) implementing the updated potential update in the data pipeline, (v) implementing the updated potential update in the digital twin to obtain a second updated digital twin and using the second updated digital twin to simulate operation of the data pipeline using the second potential update, and/or (vi) other methods.

The method may end following operation 310.

Thus, using the method illustrated in FIG. 3A, updates for a data pipeline may be proactively evaluated prior to implementation. To obtain the update, stakeholders may use context regarding different components of the data pipeline. To ensure that the information regarding the context is not stale, information regarding the components may be gathered and used to update the context.

Turning to FIG. 3B, a flow diagram illustrating a method of managing information regarding a data pipeline in accordance with an embodiment is shown. The method may be performed, for example, by a data source, data repository, downstream consumer, and/or any other entity.

At operation 320, a communication regarding a component of a data pipeline is obtained. The communication may be made by monitoring communications by stakeholders subscribed to components of the data pipeline, by obtaining user input using a graphical user interface, and/or via other methods.

At operation 322, a determination is made regarding whether the communication is relevant for management of the pipeline. The determination may be made using criteria that discriminate relevant from irrelevant communications. The criteria may include, for example, presence or lack of certain words (e.g., names of components) in the communications, frequency of occurrences of the words, etc. The determination may be made by analyzing the communication using the criteria to ascertain whether the communication is relevant for management purposes.

If it is determined that the communication is relevant for management purposes, then the method may proceed to operation 324. Otherwise, the method may end following operation 322.

At operation 324, a component data repository is populated based on the communication to obtain an updated component data repository. The component data repository may be updated by updating a context for the component based on the content of the communication, a time of sending of the communication, etc.

At operation 326, updates regarding the component are distributed based on the updated component data repository and subscriptions for components of the data repository. The updates may be distributed by (i) generating the updates and (ii) sending copies of the updates to stakeholders that are subscribed to the component. The updates may indicate that context for the component has been updated, and/or the updates made to the context for the component.

The method may end following operation 326.

Thus, using the method illustrated in FIG. 3B, context for components of a data pipeline may be updated over time. The updated context may be used in decision making processes for updates to the data pipeline.

Turning to FIG. 3C, a flow diagram illustrating a method of updating a data pipeline in accordance with an embodiment is shown. The method may be performed, for example, by a data source, data repository, downstream consumer, and/or any other entity.

At operation 340, a graphical user interface that includes graphical representations based on a data pipeline is obtained. The graphical user interface may be obtained by populating a template graphical user interface based on the components of a data pipeline. The graphical user interface may be similar to the graphical user interface shown in FIG. 2A.

At operation 342, user interest in a first graphical representation of the graphical representations is identified. The user interest may be identified by monitoring use of a human interface device by a user. The user may be used to discriminate the first graphical representation from other graphical representations. For example, a user may use a pointing device to position a cursor proximate to the first graphical representation and/or depress a button on the pointing device while the cursor is proximate to the first graphical representation.

At operation 344, based on the user interest, an additional graphical representation is added to the graphical user interface to obtain an updated graphical user interface. The additional graphical representation may be added by generating and displaying the additional graphic representation on the user interface. The additional graphical representation may include content based on context for the component associated with the graphical representation to which the user expressed interest. The additional graphical representation may be similar to that shown in FIG. 2D (e.g., interface element 262).

At operation 346, user input is obtained using the updated graphical user interface. The user input may be obtained via a popup or other mechanism. The user input may indicate a change in operation of the data pipeline.

At operation 348, operation of the data pipeline is updated based on the user input. The operation of the data pipeline may be updated by (i) translating the user input into a potential update, and (ii) performing the method shown in FIG. 3A.

The method may end following operation 348.

Thus, using the method illustrated in FIG. 3C, stakeholders may be appraised of information regarding operation of a data pipeline and context for components of the data pipeline. Consequently, the resulting user input and corresponding update to the data pipeline may be more likely to meet the needs of the stakeholders.

Turning to FIG. 4, this figure may illustrate a system similar to that of FIG. 1 in accordance with an embodiment. FIG. 4 may show actions performed by the system over time. The system may include a data pipeline made up of any number of data sources, a data repository, and/or any number of downstream consumers (not shown).

A potential update to the data pipeline may be introduced and, prior to implementing the potential update, the system may simulate operation of the data pipeline using the potential update and a digital twin of the data pipeline. Therefore, the digital twin and the data pipeline may ingest identical input data and may generate simulated performance report 400 and live performance report 402 respectively.

Simulated performance report 400 and live performance report 402 may track the progress of a data package, the data package including a timestamp and a corresponding temperature measurement obtained from one or more of the data sources. The data package may include the following information: 1994 Aug. 2, T=35° C.

The data pipeline may include any number of APIs to facilitate communications between the portions of the data pipeline (e.g., the one or more data sources, the data repository, the one or more downstream consumers, etc.). Simulated performance report 400 may include a listing of records including: (i) a format of the data package before and after encountering a first API, and (ii) a format of the data package after encountering a second API using the digital twin. Similarly, live performance report 402 may include: (i) a format of the data package before and after encountering a first API, and (ii) a format of the data package after encountering a second API using the data pipeline.

As shown by FIG. 4, the format of the data package may be unchanged after encountering API 1 and after encountering API 2 in live performance report 402. However, the data package may be missing after encountering API 2 in simulated performance report 400. A missing data package may indicate that API 2 in the data pipeline is broken (e.g., has failed). Therefore, the potential update may cause failure of the data pipeline if implemented without modification.

The system may determine whether a performance delta indicated by the difference between simulated performance report 400 and live performance report 402 meets a threshold. If the performance delta meets the threshold (e.g., via failure of one or more APIs), the potential update may not be implemented in the data pipeline and the potential update may be modified to remediate the performance delta.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft R, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data pipeline, the method comprising:
generating graphical representations of a data pipeline based on the data pipeline and populating the graphical representations onto a graphical user interface being displayed on a display of a data processing system, wherein a first portion of the graphical representations are based on databases of the data pipeline, a second portion of the graphical representations are based on application programming interfaces of the data pipeline, and a third portion of the graphical representations are based on applications of the data pipeline;
identifying, from a user of the data pipeline, user interest in a first graphical representation of the graphical representations;
based on the user interest in the first graphical representation, adding an additional graphical representation to the graphical user interface to obtain an updated graphical user interface, the additional graphical representation being based on at least one communication regarding a component of the data pipeline represented by the first graphical representation;
obtaining, from the user, user input using the updated graphical user interface;
updating operation of the data pipeline based on the user input to obtain an updated data pipeline; and
providing computer implemented services using the updated data pipeline to the user, the computer implemented services comprising at least a data storage service to store data obtained from the user using at least one of the application programming interfaces of the updated data pipeline into at least one of the databases of the updated data pipeline.

2. The method of claim 1, further comprising:
obtaining a second communication regarding the component;
making a determination regarding whether the second communication is relevant for management of the data pipeline;
in an instance of the determination where the second communication is relevant for management of the data pipeline:
populating a component data repository based on the second communication to obtain an updated component data repository; and
distributing updates regarding the component based on the updated component data repository and subscriptions for components of the data pipeline.

3. The method of claim 2, wherein the updates are based, at least in part, on the second communication.

4. The method of claim 3, wherein the at least one communication is stored in the component data repository.

5. The method of claim 2, wherein obtaining the second communication comprises:
scraping an electronic mail repository for a mail subscription user that is subscribed for the updates for the component.

6. The method of claim 1, wherein the applications use data maintained by at least a portion of the databases and that is supplied from the at least the portion of the databases by at least a portion of the application programming interfaces.

7. The method of claim 6, further comprising:
dynamically updating the first portion of the graphical representations based on changes in schemas implemented by the databases; and
dynamically updating the second portion of the graphical representations based on changes in alignment of the application programming interfaces with the schemas.

8. The method of claim 7, wherein the dynamically updating of the second portion of the graphical representations facilitates discrimination of a first portion of the application programming interfaces that are aligned with the schemas from a second portion of the application programming interfaces that are misaligned with the schemas.

9. The method of claim 1, wherein the additional graphical representation is based on communications between persons tasked with managing operation of the component, and each of the communications are relevant for management of the data pipeline.

10. The method of claim 1, wherein updating the operation of the data pipeline comprises, by the data processing system and without human intervention:
executing a change in a computer readable code or a data scheme of the data pipeline to transform at least one application programming interface, application, or database from among the application programming interfaces, the applications, and the databases, respectively, into an updated one of the application programming interface, application, or database.

11. A non-transitory machine-readable medium having instructions stored therein, which when executed by a processor, cause the processor to perform operations for managing a data pipeline, the operations comprising:
generating graphical representations of a data pipeline based on the data pipeline and populating the graphical representations onto a graphical user interface being displayed on a display, wherein a first portion of the graphical representations are based on databases of the data pipeline, a second portion of the graphical representations are based on application programming interfaces of the data pipeline, and a third portion of the graphical representations are based on applications of the data pipeline;
identifying, from a user of the data pipeline, user interest in a first graphical representation of the graphical representations;
based on the user interest in the first graphical representation, adding an additional graphical representation to the graphical user interface to obtain an updated graphical user interface, the additional graphical representation being based on at least one communication regarding a component of the data pipeline represented by the first graphical representation;
obtaining, from the user, user input using the updated graphical user interface;

updating operation of the data pipeline based on the user input to obtain an updated data pipeline; and providing computer implemented services using the updated data pipeline to the user, the computer implemented services comprising at least a data storage service to store data obtained from the user using at least one of the application programming interfaces of the updated data pipeline into at least one of the databases of the updated data pipeline.

12. The non-transitory machine-readable medium of claim 11, wherein the operations further comprise:

obtaining a second communication regarding the component;

making a determination regarding whether the second communication is relevant for management of the data pipeline;

in an instance of the determination where the second communication is relevant for management of the data pipeline:

populating a component data repository based on the second communication to obtain an updated component data repository; and distributing updates regarding the component based on the updated component data repository and subscriptions for components of the data pipeline.

13. The non-transitory machine-readable medium of claim 12, wherein the updates are based, at least in part, on the second communication.

14. The non-transitory machine-readable medium of claim 13, wherein the at least one communication is stored in the component data repository.

15. The non-transitory machine-readable medium of claim 12, wherein obtaining the second communication comprises:

scraping an electronic mail repository for a mail subscription user that is subscribed for the updates for the component.

16. A data processing system, comprising:

a processor; and a memory coupled to the processor to store instructions, which when executed by the processor, cause the data processing system to perform operations for managing a data pipeline, the operations comprising:

generating graphical representations of a data pipeline based on the data pipeline and populating the graphical representations onto a graphical user interface being displayed on a display, wherein a first portion of the graphical representations are based on databases of the data pipeline, a second portion of the graphical representations are based on application programming interfaces of the data pipeline, and a third portion of the graphical representations are based on applications of the data pipeline;

identifying, from a user of the data pipeline, user interest in a first graphical representation of the graphical representations;

based on the user interest in the first graphical representation, adding an additional graphical representation to the graphical user interface to obtain an updated graphical user interface, the additional graphical representation being based on at least one communication regarding a component of the data pipeline represented by the first graphical representation;

obtaining, from the user, user input using the updated graphical user interface;

updating operation of the data pipeline based on the user input to obtain an updated data pipeline; and providing computer implemented services using the updated data pipeline to the user, the computer implemented services comprising at least a data storage service to store data obtained from the user using at least one of the application programming interfaces of the updated data pipeline into at least one of the databases of the updated data pipeline.

17. The data processing system of claim 16, wherein the operations further comprise:

obtaining a second communication regarding the component;

making a determination regarding whether the second communication is relevant for management of the data pipeline;

in an instance of the determination where the second communication is relevant for management of the data pipeline:

populating a component data repository based on the second communication to obtain an updated component data repository; and distributing updates regarding the component based on the updated component data repository and subscriptions for components of the data pipeline.

18. The data processing system of claim 17, wherein the updates are based, at least in part, on the second communication.

19. The data processing system of claim 18, wherein the at least one communication is stored in the component data repository.

20. The data processing system of claim 17, wherein obtaining the second communication comprises:

scraping an electronic mail repository for a mail subscription user that is subscribed for the updates for the component.

* * * * *